3,305,611
PROCESSES FOR THE BURNING OF MATERIALS IN INDUSTRIAL PROCESSES

Eberhard Spohn, Heidelberg, Germany, assignor to Portland-Zementwerke Heidelberg Aktiengesellschaft, Heidelberg, Germany
No Drawing. Filed Apr. 14, 1964, Ser. No. 359,784
Claims priority, application Germany, Sept. 4, 1963, P 32,520
6 Claims. (Cl. 263—53)

This invention relates to improved processes for the burning of materials in industrial processes and more particularly to improvements in the burning of lime or Portland cement powder with granulated fuel to respectively produce quicklime and Portland clinker.

According to German Patent No. 1,028,487, the endothermic processes of the equation $$CO_2 + C \rightleftharpoons 2CO$$

on which the Boudouard equilibrium is based, are used in a shaft kiln process for the production of quicklime and Portland clinker which is particularly well-suited for converting into the particularly reactive gaseous form, i.e., into carbon monoxide, a fuel with high carbon content, in an atmosphere which has little or no oxygen. The most important part of the $CO_2$ which is to be reduced to CO, according to Boudouard, comes from the carbonates of calcium and magnesium of the lime powder or the Portland cement raw powder.

The fuel is ordinarily mineral coal coke and other types of coke, but it may also be lean natural coal. The fuel is ground, according to the German patent, together with the lime or the Portland cement raw material. The result is a raw powder which is particularly dark in color because of the fuel, whereby the process is known as the "black powder process."

The many advantages of fuel grinding are explained in the German patent.

The essence of the "Black Powder Process," lies in the increase in the surface of the fuel which gives the fuel the opportunity, at sufficiently high temperature, according to the Boudouard reaction equation, to react with the $CO_2$ resulting from the decarbonization of the carbonates, the said reaction commencing weakly at a temperature of approximately 500° C., with formation of CO, but being very much more intense than was possible with the hitherto customary fuel fines of, for example, approximately 0–7 mm. grain size.

The fuel gasification inside the granulated material of the individual rotary kilns is thus considerably improved by the particularly marked increase in the surface of the fuel and the gasification cannot be impeded as a result thereof by a deficiency of oxygen of the air. As is known, satisfactorily ignitable and very reactive gaseous CO forms which, in the (compressed) air flowing at high velocity in the numerous passages of the heap formed by the granulated material in the shaft kiln, burns extremely quickly to form the end product, $CO_2$, whenever it comes in contact with oxygen of the air.

The clinker granules formed according to the Black Powder Process have a particularly porous, distinctly shell-like structure which is satisfactorily gas-permeable.

Quite apart from other advantages, the increased gas permeability effects a more rapid combustion of all the intermediate products of the combustion and a more rapid transfer of the heat energy formed to the granulated material which, in the case of Portland clinker products, are to be sintered, or to the lime granules of pure lime rotary kilns which are to be mildly burnt.

Under these favorable physical and chemical conditions there is obtained regularly an increased output of the shaft furnaces operating according to the "Black Powder Process" as compared with the outputs which hitherto were customary. It is accompanied by a reduction in the fuel consumption which both technically and economically, is of very great importance.

With correct proportioning of the fuel, there is formed in the furnace, from the powder used for Portland cement, smaller clinker aggregates which enable the original shape of the granulated material to still be clearly recognized. By the use of combustion material which can be easily sintered there is a tendency for the material to cake together only to a relatively slight degree whereby the formation of objectionable "clinker stock" which would interfere with the burning process in Portland rotary kilns does not occur. This represents a particularly important technical and economical advantage. Therefore, since the black powder clinker does not bring about any large-scale caking together of the clinker, the completely sintered clinker in which all the clinker minerals are fully converted remains movable and, under certain circumstances, flowable.

With new and robust constructions of rotary grates, the principle of which has already been applied in allied industries, the material which is discharged from the shaft furnace is prevented, from sliding out of the latter freely and unchecked. These grate constructions which are described in German Patent 1,124,864 (1954) are capable of comminuting the clinker should this be necessary and discharging the clinker from the shaft furnace in amounts periodically adjustable in time. However, they also permit a uniform distribution of the air over the entire cross section of the shaft furnace, which is very important for complete combustion.

By using such rotary grates it was possible for the first time to successfully withdraw clinker from the shaft furnace, with an optimum degree of uniformity, by the "Black Powder Process" and, as a result, the sinter zone in the shaft furnace could be restricted to a relatively short (cylindrical) space, and, with satisfactory operation of the shaft furnace which is easily attainable always remains at its particular place corresponding to the heat economy and the operational measures of the burner. A harmful breaking of the combustion zone which previously was a common occurrence when lean fuels in the form of fines was used, practically never occurs when operating the shaft furnace according to the "Black Powder Process."

There are several disadvantages to the "Black Powder Process" and it is an object of this invention to overcome these disadvantages. These disadvantages will be pointed out subsequently in the specification after the process has been discussed more fully.

By means of the black powder process in conjunction with the discharge through a rotating grate of the type according to German Patent 1,124,864, tests confirm that, despite the presence of some CO which, in practice, cannot be entirely avoided, in the region above the upper limit of the highest temperatures and markedly decreasing contents of oxygen, with careful operation of the furnace and addition of fuel accurately adapted to the composition of the furnace powder, a clinker is produced which is barely reduced. Accordingly, there is hardly any over-burnt clinker aggregates to give appearance of reduction, while under a magnifying glass there do not appear even the finest ground fuel particles. In this way it can be indirectly evaluated that the heat economy of the shaft furnaces operated according to the black powder process is a considerable improvement over the heat economy of the hitherto known methods of burning in shaft furnaces.

According to German Patent No. 1,028,487, the fuel is coal which should be reduced in size to below 1 mm. in order to achieve the effect of a complete gasification. In actual practice the fuel and the raw powder are ground together.

It will be shown hereinafter that the grinding of the fuel and the powder together is wasteful of energy and in this respect one of the significant features of the invention is to separately grind the fuel and powder such that maximum economy of fuel is obtained.

Earlier installations in New Zealand, Japan, Austria and the Federal Republic of Germany operate according to the principle of this joint grinding. The desired effect of the Black Powder process was not always obtained however with joint grinding. In one instance, when the type of fuel was changed, brown reduced zones appeared in the core of the granulated material, while in another instance a normal burning operation could only be maintained if the mixture of black powder was ground to a very high degree of fineness such as would not have been necessary with the respective raw materials themselves. Because of this, the costs were almost twice as high as originally contemplated. And even then, brown reduced core zones were still to be found.

The heating of the distinct granulated material in the furnace proceeds very rapidly from the outside to the inside. In this respect, between the outside layers and the inner layers, temperature differences of 100° C. and more can occur. A slow-reacting fuel which ignites only above strong dissociation of $CaCO_3$, naturally will not be able to take from the directly adjacent $CaCO_3$ grains the $CO_2$ required for the reaction, as the said grains are already deoxidized. The coal of the marginal layer thus has to use the $CO_2$ which flows to the outside from the inside of the granulated material which is still not fully heated. When the granulated material has been completely deoxidized right to the core, then the fuel will already be gasified in all the remaining layers of such granulated material. In the core, however, there remains a residual zone, the fuel particles of which no longer have any carbon dioxide available for the reaction according to the Boudouard equation and thereby a portion of the fuel is wasted.

Thus, reduction, more particularly of the iron compounds, must still occur in the core by means of the remaining fuel.

The incomplete gasification represents waste of fuel. The reduction phenomena have a particularly harmful effect on the quality of the cement. E. Woermann ("The Decomposition of Alite in Technical Portland Cement Clinker," 4th International Symposium of Cement Chemistry, Washington, 1960) has shown that they bring about the decomposition of already formed $C_3S$ into $C_2S$ and free lime. Such $C_2S$-containing cement has not only poor initial strength; in addition, the free lime causes an expansion. We have therefore looked for possibilities of measuring and influencing the reactivity of the different fuels.

It is an object of the invention to provide compensation for differences in fuel reactivities to obtain complete utilization of the fuel for complete deoxidation of the granulated material.

It is known that the good ignition qualities and the rate of combustion of lean fuels, particularly carbonized fuels, depend on the prior history of these fuels, for example, with charcoals and cokes, the ignition qualities and the rate of combustion depend on the temperature and duration of coking.

According to Jacques Mounier in his book "Gasification of Solid Fuels and Oxidative Conversion of Hydrocarbons" (German translation 1962, Weinheim, Bergstrasse), page 237, the rate of combustion into $CO_2$ in the Boudouard reaction and water gas reaction generally proceed in parallel with the same tests on (lean) fuel. Jacques Mounier devotes pages 234 to 242 of his work to the almost equally important "Idea of the Reactivity of Fuels" which, according to his convincing data, can only be ascertained empirically.

Since the reactivity of fuels is determined by a large number of factors, it cannot be expressed with scientific accuracy. For these spheres which are of direct and indirect importance for practically all industries, there exist empirical rules based only on practice and which are of a more general character, for instance, the reactivity of carbonized fuels depends on their original degree of coking, on their inner surface which can only be approximately determined and which still alters in the course of the gasification and combustion process, and on the amount and the chemical composition of the ash which, as is known, can vary to a great extent. According to all practical experience and to comparative laboratory tests, the "reactivity" of different carbonized fuels which is attainable during complete combustion and, as already mentioned, with completely parallel tests for gasification with $CO_2$ and $H_2O$ can be classified in order of falling "reactivity" as follows: charcoals carbonized at high temperature, peat and low-temperature lignite, coke, gas coke, metallurgical coke and retort and electrode coke. In the end part of this series, accordingly, there can be added anthracite and graphite which, as is known, are lean natural products.

This series is only of a general and, thus, a qualitative character. Each individual fuel may vary in reactivity as a result of the great number of influences which increase or reduce the reactivity of the types of fuel, so that there is much overlapping of fuels as regards reactivity. Consequently, there is no alternative but to examine fuels for "reactivity" under comparative conditions which are defined as accurately as possible.

The methods and the literature pertaining thereto are abundant. Reference will only be made to summaries which are in the nature of references, for example, A. Bruckner, "Manner of Investigating Solid Fuels" (Munich 1943), pages 220–228, and to "Ullmanns Enzyklopadie der Technischen Chemie" (Ullmann's Encyclopaedia of Technical Chemistry), vol. 10 (Munich, Berlin, 1958), pages 362 to 369, and also to the article, "Contribution to the Combustion Mechanism of Carbon" (E. Wicke), 5th Symposium on Combustion, Pittsburgh, 1954, Reinhold Publ. Co., New York, 1955, pages 245 to 252 (containing twenty-nine references), also included therein are the sections, "Increase of the Inner Surface of the Electrode Carbon During Gasification" and "True Activation Energies of $O_2$-Gasification of Carbon."

From the following Table I it is apparent that the Boudouard reaction proceeds fairly completely even at a temperature below 900° C., i.e. at the temperature of complete deoxidation of the $CaCO_3$:

the shaft furnace according to the black powder process. Therefore, according to operating experience and physi-

TABLE I

|  | 450° C. | 600° C. | 650° C. | 700° C. | 750° C. | 800° C. | 900° C. | 1,000° C. |
| --- | --- | --- | --- | --- | --- | --- | --- | --- |
| $CO_2$ (vol. percent) | 98 | 77 | 61.5 | 42.3 | 24.7 | 6.0 | 2.8 | 0.7 |
| $CO$ (vol. percent) | 2 | 23 | 38.5 | 57.7 | 75.3 | 94.0 | 97.2 | 99.3 |

Naturally this data also applies to the gasification of carbon at the periphery of and inside a black powder mixture.

The speed of this reaction rests basically in the powdered mixture and, as indicated in the foregoing, in part, is not only dependent on the nature of the fuel but also on:

(a) The extent of the outer relative surface of the fuel grains and, accordingly, its degree of fineness of grinding, and (b) On its inner surface which usually becomes larger with high temperatures according to appropriate investigations by A. Daime and H. J. Junker (Brennstoff-Chemie No. 13/14, 1955, page 198).

In the process according to German Patent No. 1,028,487, the lean fuel was always ground together with the pre-pulverized Portland cement raw materials, as in this way it could be brought in the most economical manner to the required degree of fineness, namely below 1 mm.

However, it is not only the grindability of the fuels which is different from that of the raw powder but, more particularly, their bulk density and specific weight. Because of this, the air separator which is included in the cycle with the pulverizers has a different separating range for fuels than for limestone and the raw materials of Portland cement. Coarser fuel grains than the limestone grains are obtained in the fine material. This is particularly noticeable with porous coke which, in addition, frequently has at the same time a poor grindability and a poor "reactivity." Accurate grain analyses have shown that in the black powder which was ground in the common grinding of fuel and limestone to a 10% residue on the 0.09 mm. sieve, the fuel portion showed, depending on the type of fuel, a residue of more than 40% on the 0.09 mm. sieve.

It is easy to see that the Boudouard reaction in the granulated material of the shaft furnace which is influenced by the grain size of the fuel, and also the complete combustion of carbon by means of the CO of the Boudouard process into $CO_2$, are dependent on the fuel particle size which is a function of the degree of fineness of grinding, as well as on the corresponding bulk distribution in the granulated material.

Thus naturally there is also associated therewith the operation of the shaft furnace by automatic partial control and the operation of the burner-man which controls the furnace. This also applies to the use of a technically uniform type of fuel, the grindability of which from batch to batch can naturally differ, and it certainly applies to fuel mixtures and fuels which by nature are non-uniform and, more particularly, with overall changes of shaft furnace fuels which are governed usually by economic considerations.

In short, with the former method of grinding black powder for shaft furnaces, the fuel in the powder is obtained in grain sizes which depend on the many repeatedly mentioned influences which extend from the quarry right up to grinding of the (black) powder and which, on account of the lasting and difficultly recognizable changes of the fuel cannot be kept adequately constant. Consequently, the fuel is seldom if ever ground to such a degree of fineness as is necessary for a satisfactory and, at the same time, an economical burnt clinker in cal, chemical and technical considerations, it is, without doubt, necessary as a departure from the former mode of operating, to:

(1) grind the fuel in question separately from the lime-containing raw materials;

(2) adapt the degree of grinding fineness of the fuel to the "reactivity" thereof.

The above are considerations which have not heretofore been contemplated in the art and in this respect constitute novel innovations.

According to laboratory tests run by the applicant for ascertaining the fuel gasification in black powder granulated material according to the Boudouard equation in $N_2$ and/or Ar current, twenty uniform or mixed shaft furnace fuels from West Germany, and Central Germany, Austria, Spain, Poland, the Soviet Union and Japan were ground to a 10% residue on the 0.09 mm. DIN sieve and intimately mixed with one fuel-free, finished shaft furnace powder in the weight ratio of 10.0 to 90.0 and examined in the form of granulated material (after drying at 105° C.). (Gasification temperature 1000° C.; duration of gasification in completely pre-heated furnace, 30 minutes.) Apart from several uniform mixed fuels which are named hereunder, these are lean fuels. The samples of fuels are deemed to provide conditions prevalent in actual works. There was found to be amongst the fuels brown coal low temperature coke, petroleum coke, anthracite and gas coke, and metallurgical coke (as uniform fuels).

The brown coal low temperature coke which, because of its manner of production, naturally still contains some hydrocarbons, under the comparative conditions described shows a 100% gasification of its carbon through $CO_2$. The gas coke and metallurgical coke of German origin only were gasified to about 50 to 60%. Between this were the customary foregoing uniform and mixed lean, solid, technical fuels, whereby the anthracites examined, which come from the Federal Republic of Germany, Spain and the Soviet Union, distinctly showed an improved reactivity as compared with the bituminous coke.

The order of the fuels corresponds, with some approximation, to the above-mentioned general experiences known both with regard to the combustion in the oxygen current as well as to the fuel gasification. These were supplemented by a survey published by the applicant in 1961 in which there was compared the ignition temperature in an oxygen current of brown coal low temperature coke, anthracites, petroleum coke and coke fines which are used as fuel in the shaft furnaces of the applicant's own works, with the strength of their gasification by $CO_2$ (see "Die Hauenschild'sche Reaktion beim Zement-Schachtofen"—"The Hauenschild Reaction With the Cement Shaft Furnace"—by E. Spohn, Heidelberg, Cement-Lime Plaster, No. 3/1961, pages 105–108).

In order to clarify the influence of the degree of fineness of grinding on the gasification by $CO_2$, these different fuels were ground to three different stages of fineness which can also be taken into consideration from a technical aspect.

From the comparison of the following Table II it can be seen more particularly that the scope of the gasification by $CO_2$ with one and the same fuel as well as with different types of fuel can be increased by a finer grinding thereof. It is also pointed out that the Table II shows the connection between the ignition temperature in the oxygen current and the gasification intensity with carbon dioxide.

as a difficultly grindable high temperature mineral coke (metallurgical coke) which is slow to react, (2) To carry out a combined grinding of lime or Portland cement raw materials with lean fuels, since en-tirely different grinding principles apply, as regards fineness requirements, for the raw powder and for the fuel.

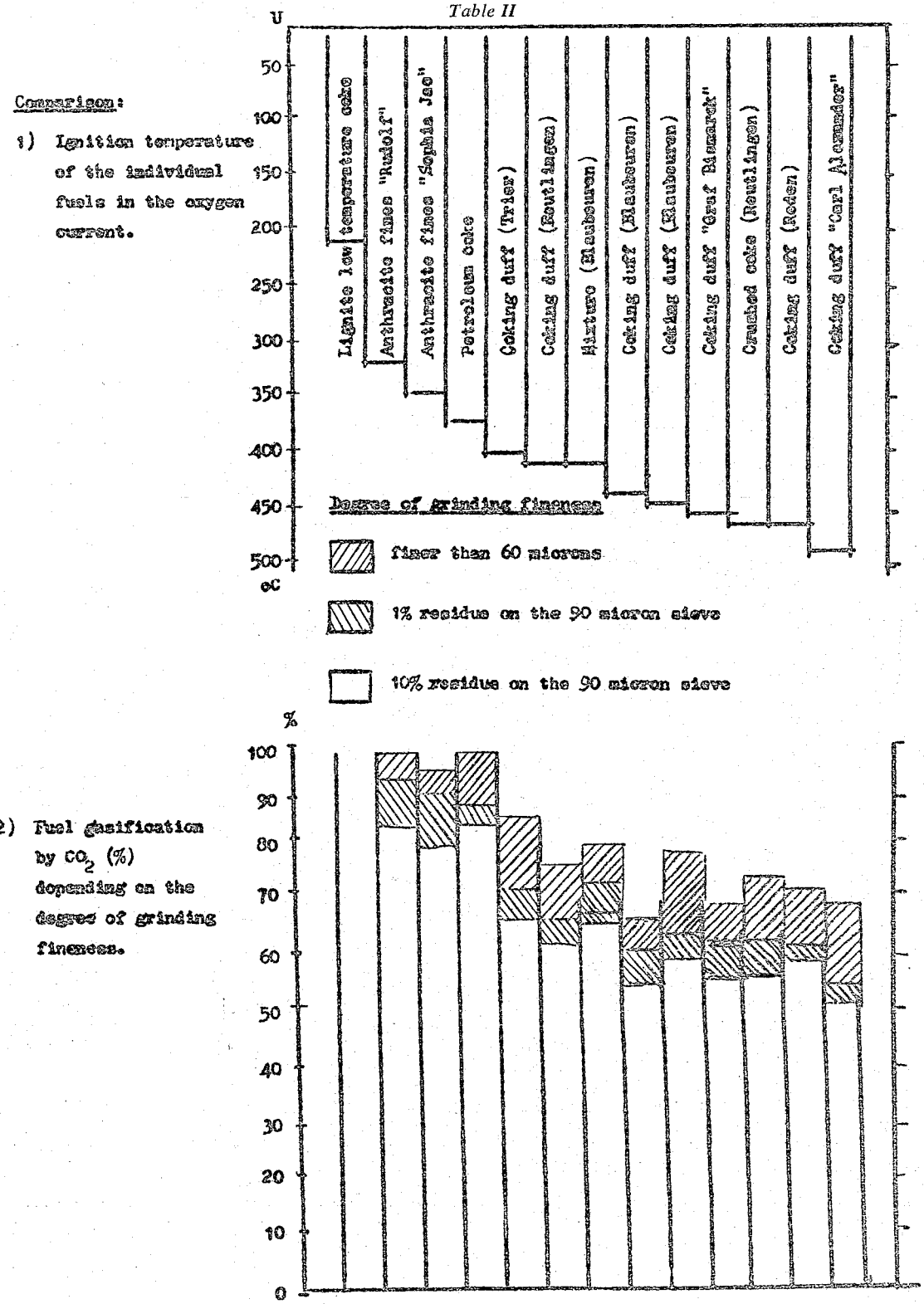

From the knowledge collected from many places throughout the world concerning the operating practice for the black powder process, and from all the foregoing data—if only for reasons of economy—it is technically not suitable, for example (1) To grind a brown coal (high temperature) coke which is easily grindable, to the same degree of fineness In most cases it would be uneconomical to grind in a combined operation the whole mixture to such a degree of fineness that one component, for example the hard coke which is of light specific weight, would be sufficiently fine. Rather than this, in accordance with the present invention there is provided a process for improving the burning of lime and Portland clinker, more particularly in shaft furnaces, while adjusting the degree of fineness of grinding of the fuel admixed with the raw powder in accordance with its reactivity with the $CO_2$ of the carbonates, the said reactivity being characterized by the fact that the type of fuel used, corresponding to its reactivity ascertained at a normal temperature of advantageously 1000° C. within a standard period of, advantageously, 30 minutes, with passing through of a gas of controlled velocity and which does not react with the solids, is brought with the $CO_2$ of the carbon-containing raw powder being used at the time to a degree of fineness of grinding which is just sufficient to obtain, with the said method of testing, an approximately complete—at least to 40%—gasification of the fuels (without air).

According to a preferred form of embodiment of the process, the fuel which has been brought to the optimum degree of grinding fineness is intimately mixed with the carbon-containing raw powder for the burning in the shaft furnace.

The following example will serve to further explain the invention.

*Example*

An average test of the fuel used for the black powder process and dried at 105° C. is ground in the laboratory to, for example 30%, 20%, 10% or 5% residue on the 0.09 mm. sieve or a comparable "Blaine" fineness. The ground fuels are each mixed intimately and without material loss in the proportion of 10.0:90.0 with the operating furnace powder in question having a customary degree of grinding fineness, for example by using a magnetic stirrer. From the resultant black powder, granulated material of approximately 12 mm. diameter is shaped with suitable addition of water, and dried at 105° C. It is gasified in a nitrogen or argon atmosphere for 30 minutes at 1000° C. With the aid of the ascertained values for the loss on ignition of the raw powder and of the combustible portion in the fuel, the portion which can be gasified is ascertained in the black powder tests carried out in the laboratories on fuels of dicerent degrees of grinding fineness.

According to an abundance of actual experience with shaft furnaces operated according to the black powder process, there can be recommended for any lean fuel a grinding fineness which achieves as complete a gasification as possible by applying this mode of testing. 50 to 60% of "gasified" material has been found to be still tolerable making allowances for slight reduction phenomena. Below 30% it can lead to quite perceptible difficulties in burning. Accordingly, under certain circumstances, stages between the aforesaid stages of grinding fineness of the fuel according to this method should be examined in order to be able to determine exactly the degree of grinding fineness of the fuel for the black powder shaft furnace operation when using the fuel examined. The fuel which is examined in the manner thus ascertained and pre-checked carefully in the way described, industrially is ground to the theoretical residue considered to be the optimum on the 0.09 mm. sieve (or to the corresponding Blaine fineness) in the dry state (or possibly even wet). With the customary dry grinding which is technically well-established, it is very intimately mixed by known means with the (fuel-free) raw powder which is of the customary degree of grinding fineness as established in operation. In the shaft furnace this procedure leads to a very uniform fuel burning and to a particularly good clinker. The pelletizing of the black powder obtained in this way has never before been used, and can be carried out in customary pelletizers.

The operational tests conducted by the applicant have established empirically the surprisingly novel fact that a separate grinding, followed by intimate mixing, of lean solid fuels within certain limits with shaft furnace powder, more particularly for the production of spent lime and Portland clinker, have the following advantages:

(1) An appreciable reduction in the formation of clinker grains or lime grains or light clinker conglomerates which are burnt only in a slightly reducing manner;

(2) An increase in the heat economy of the burning in the shaft furnace;

(3) An increase in the daily output of shaft furnaces;

(4) A saving in the grinding operation of up to 50%, and more, which, depending on the properties of the materials to be ground, is frequently considerable.

The above advantages are obtained provided that the grinding of the fuel for the process is carried out separately from that of the lime-containing raw materials and the fuel powder which is to be carefully mixed into the finished furnace powder is brought to an optimum degree of grinding fineness. This can be achieved according to the foregoing description.

What is claimed is:

1. A method of deoxidizing a carbonate with a fuel product in a furnace, said method comprising separating a portion of the fuel product and grinding samples of the same to different finenesses, mixing with each sample the same portion by weight of ground carbonate, gasifying the thus mixed samples in an inert atmosphere at the same temperature for equal time periods, measuring the weight loss of the ground carbonate and of the combustible portion of the fuel for determining the magnitude of gasification of the fuel product, grinding the remainder of the fuel product to a fineness corresponding to maximum gasification of the fuel product as determined from the measurements of the samples, intimately mixing the ground fuel product with the carbonate and heating the thus formed mixture in a furnace to deoxidize the carbonate.

2. A method as claimed in claim 1, wherein said fuel product is ground to a degree of fineness which is sufficient to obtain a minimum gasification of 40% of the fuel product in the absence of air.

3. A method as claimed in claim 1, wherein the samples are mixed with the carbonate in a weight ratio of 1:9, moistening the thus mixed samples with water, forming the mixed samples into granules 12 mm. in diameter, then drying the granules at 105° C. and calcining the granules in an electrically heated laboratory furnace at 1000° C. for 30 minutes in an oxygen-free inert gas current of controlled velocity.

4. A process as claimed in claim 3 wherein the inert gas current is nitrogen.

5. A process as claimed in claim 3 wherein the inert gas current is argon.

6. A method of correlating the degree of fineness to which a fuel product is ground with the reduction of lime in powder form, said method comprising: grinding the fuel product into separate samples of different degrees of fineness, admixing each of the samples with the lime powder in a weight ratio of 1:9, adding water to the resultant mixtures, forming elements of approximately 12 mm. in diameter from the latter mixtures and then drying the elements at a temperature of 105° C., gasifying the elements in an inert atmosphere for 30 minutes at 1000° C. and correlating the portion of the fuel sample which has been gasified with the degree of fineness of grinding thereof.

References Cited by the Examiner

UNITED STATES PATENTS 1,283,483   11/1918   Dwight et al. _____ 263—53
3,098,886   7/1963    Friese _____ 263—53

FREDERICK L. MATTESON, Jr., *Primary Examiner.*

JOHN J. CAMBY, *Examiner.*